United States Patent
Smith et al.

(10) Patent No.: US 11,736,272 B2
(45) Date of Patent: Aug. 22, 2023

(54) IDENTIFIABLE RANDOM MEDIUM ACCESS CONTROL ADDRESSING

(71) Applicant: SR Technologies, Inc., Sunrise, FL (US)

(72) Inventors: Graham K. Smith, Boca Raton, FL (US); Olivia Turner, Pompano Beach, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 18/073,036

(22) Filed: Dec. 1, 2022

(65) Prior Publication Data

US 2023/0208617 A1   Jun. 29, 2023

Related U.S. Application Data

(60) Provisional application No. 63/359,048, filed on Jul. 7, 2022, provisional application No. 63/287,137, filed on Dec. 8, 2021.

(51) Int. Cl.
*H04L 9/08* (2006.01)
*H04W 12/037* (2021.01)
(Continued)

(52) U.S. Cl.
CPC .......... *H04L 9/0819* (2013.01); *H04W 8/005* (2013.01); *H04W 12/037* (2021.01); *H04W 84/12* (2013.01)

(58) Field of Classification Search
CPC .. H04L 9/0819; H04W 8/005; H04W 12/037; H04W 84/12
See application file for complete search history.

(56) References Cited

U.S. PATENT DOCUMENTS

2005/0254653 A1* 11/2005 Potashnik ............... H04L 63/08
                                                            713/171
2013/0301607 A1* 11/2013 McCann ............. H04W 12/062
                                                            370/328

(Continued)

OTHER PUBLICATIONS

Vijayakumar et al., "Prevention of Multiple Spoofing Attacks with Dynamic MAC Address Allocation for Wireless Networks", Apr. 2014, International Conference on Communication and Signal Processing, pp. 1635-1639 (Year: 2014).*

(Continued)

*Primary Examiner* — Kenneth W Chang
(74) *Attorney, Agent, or Firm* — Christopher & Weisberg, P.A.

(57) ABSTRACT

A method for a mobile station (STA) is described. The method may be performed to use an identifiable medium access control (MAC) random (IRM) address (IRMA) to associate to an access point (AP). The method includes exchanging one IRM key (IRMK) with the AP for each association of a plurality of associations; determining an IRM hash using the IRMA and the IRMK exchanged with the AP at an immediately previous association of the plurality of associations and/or a temporal element; associating to the AP using the IRMA as a transmitted address (TA); and transmitting an association request including the IRM hash. The transmitted association request triggers the AP to one or both of check a list of stored IRMKs to find one stored IRMK that together with the IRMA produces the IRM hash included in the association request and identify the STA by the one IRMK.

20 Claims, 15 Drawing Sheets

(51) Int. Cl.
    *H04W 8/00*    (2009.01)
    *H04W 84/12*   (2009.01)

(56) References Cited

U.S. PATENT DOCUMENTS

2014/0289516 A1* 9/2014 Sahay ................. H04L 63/0823
                                                      713/173
2016/0105764 A1* 4/2016 Evans .................... G08B 21/24
                                                      340/539.13
2019/0141474 A1* 5/2019 De La Broise ......... H04W 4/02

OTHER PUBLICATIONS

Letsoalo et al. "Survey of Media Access Control address spoofing attacks detection and prevention techniques in Wireless Networks", May 2016, IST-Africa Week Conference, pp. 1-10 (Year: 2016).*

* cited by examiner

Action field format

| Bit | Information | Notes |
|---|---|---|
| <ANA> | IRM Capability | The STA or AP sets IRM Capability subfield to 1 to indicate support for IRM and sets to 0 if IRM is not supported. |

IRM Capability addition to
Extended Capabilities field

FIG. 6  IRM element format

FIG. 7

IRM Indicator

| IRM Indicator field value | Field name | Notes |
|---|---|---|
| 0 | Private | A Field value of 0 indicates that the STA is using a private random address |
| 1 | Unknown | A Field value of 1 indicates that the STA has not previously provided an IRMK to the AP |
| 2 | Known | A Field value of 2 indicates that the STA has previously provided an IRMK to the AP |
| 3-255 | Reserved | |

IRM Action field

| Action Details field value | Meaning |
|---|---|
| 0 | IRMK Request |
| 1 | IRMK Response |
| 2-255 | Reserved |

IRMK Request Action field

IRMK Response Action field

KDE format

IDENTIFIABLE RANDOM MEDIUM ACCESS CONTROL ADDRESSING

CROSS-REFERENCE TO RELATED APPLICATIONS

This application is related to and claims priority to U.S. Provisional Patent Application No. 63/287,137, filed Dec. 8, 2021, entitled IDENTIFIABLE RANDOM MAC ADDRESSING, the entirety of which is incorporated herein by reference, and U.S. Provisional Patent Application No. 63/359,048, filed Jul. 7, 2022, entitled IDENTIFIABLE RANDOM MAC ADDRESSING, the entirety of which is incorporated herein by reference.

TECHNICAL FIELD

The present disclosure relates to methods, apparatuses, and systems for addressing win wireless local area networks (WLANs).

BACKGROUND

Initially, it is noted that Institute of Electrical and Electronics Engineers (IEEE) Standard 802.11-2020 is used as the base reference for disclosures used herein, the entire contents of which are incorporated herein by reference. The IEEE 802.11-2020 Standard is commonly referred to as "Wi-Fi" and may be referred to as such or simply as "the Standard" herein. This disclosure relates to the addressing used by devices that are based upon the IEEE 802.11 technology.

The medium access control (MAC) address of a Wi-Fi device has historically been a unique hardware address that identified the device. However, having this MAC address openly broadcast has meant that the device may be easily observed and tracked, without the user's permission.

FIG. 1 is a block schematic diagram of a typical IEEE 802.11 infrastructure network 100. A number of mobile nodes, or stations STA 120a, 120b, 120c, 120d, 120e and 120f (collectively referred to as "mobile nodes 120") may or may not be associated with access point AP 110 which, in turn, is in communication with a hard-wired distribution system DS 130. In such a network, the AP 110 will periodically transmit beacons in order to allow the unassociated mobile STAs 120 to locate and identify the network and will allow the AP 110 to convey information to the associated mobile STAs 120.

FIG. 2 depicts a format of an IEEE 802.11 Management frame 200. The frame 200 consists of a MAC Header 210, which comprises Frame Control, Duration, Address fields, optional Sequence Control information and optional HT Control fields, a variable length Frame Body 220 and a Frame Check Sum (FCS) 230. Type and Subtype fields in the Frame Control field 212 define the function of the frame, e.g., Association Request is Type 00, Subtype 0000. In the MAC Header 210, Address 1 215 identifies the receive address (RA) of the intended receiver of the frame, and Address 2 216 identifies the transmit address (TA) of the transmitter of the frame. Each address field contains a 48-bit address known as a MAC address where the Individual/Group I/G bit is always transmitted first, and the Universal/Local U/L bit is transmitted second. A MAC address, where the U/L bit is set to 1, is referred to as being a "locally administered MAC address".

In order to associate to the AP 110, STA 120 sends an Association Request management frame to the AP 110 with Address 1, RA 215 set to the MAC address of the AP 110, and Address 2, TA 216, set to the STA's MAC address. Similarly, if STA 120 is searching for AP 110, it may transmit Probe Request management frames again setting Address 2 TA 216 to the MAC address of the STA 120.

As described in the Standard (Clause 4.5.4.10), when a Wi-Fi station, STA 120, is searching for, or connects to a Wi-Fi network, i.e., an access point AP 110, it defines the addressing of its MAC layer for the particular connection. Similarly, when a STA attempts to discover services on a network before associating, i.e., during preassociation, it also defines the addressing of its MAC layer. If STA 120 uses a fixed MAC address, it is trivial to track the STA 120, and this tracking may be used to glean private and sensitive information regarding the individual behind the STA 120. Furthermore, even without establishing a connection, a mobile or portable STA 120 that gratuitously transmits Probe Request frames containing service set identifiers (SSIDs) of favored networks can reveal potentially sensitive information about the STA's location and location history. To mitigate this privacy concern, a STA may periodically change its MAC address prior to association.

"Requirements for support of MAC privacy enhancements" was introduced in the IEEE 802.11-2020 Standard. The Standard states that a STA 120 may periodically change its MAC address to a random value while not associated. However, the STA 120 is expected to set the locally administered address bit in the MAC address, but if the STA 120 is (re)associating with an AP with which it has been previously associated, the STA should change its MAC address to that used when previously associated.

The introduction of MAC randomization has generally prevented the tracking of users but has also caused impact and problems with some network operations and "use cases" that require knowledge of an identity of a STA. In other words, randomization of the MAC address can create issues. Such issues may include the steering of STAs to appropriate APs/networks, parental controls, network access controls, device limits, and diagnostics. Although some "requirements," such as that a STA 120 uses the same MAC address every time it (re)associates to the same AP 110, may be used to mitigate some of the issues to some extent, such "requirements" are not without privacy concerns.

SUMMARY

Some embodiments provide methods, apparatuses, and/or systems for associating to an access point (AP). According to one aspect, a method for a mobile station (STA) is described. The method may be performed to use an identifiable medium access control (MAC) random (IRM) address (IRMA) to associate to an access point (AP). The method includes exchanging one IRM key (IRMK) with the AP for each association of a plurality of associations; determining an IRM hash using the IRMA and the IRMK exchanged with the AP at an immediately previous association of the plurality of associations and/or a temporal element; associating to the AP using the IRMA as a transmitted address (TA); and transmitting an association request including the IRM hash. The transmitted association request triggers the AP to one or both of check a list of stored IRMKs to find one stored IRMK that together with the IRMA produces the IRM hash included in the association request and identify the STA by the one IRMK.

According to another aspect, a mobile station (STA) is described. The STA is configured to use an identifiable medium access control (MAC) random (IRM) address (IRMA) to associate to an access point (AP). The STA includes processing circuitry configured to cause exchange of one IRM key (IRMK) with the AP for each association of a plurality of associations and determine an IRM hash using the first or both of: (1) the IRMA and the IRMK exchanged with the AP at an immediately previous association of the plurality of associations; and (2) a temporal element. The processing circuitry is further configured to associate to the AP using the IRMA as a transmitted address (TA); and cause transmission of an association request including the IRM hash, the transmitted association request triggering the AP to one or both of check a list of stored IRMKs to find one stored IRMK that together with the IRMA produces the IRM hash included in the association request; and identify the STA by the one IRMK.

According to another aspect, a system comprising a mobile station (STA) and an access point (AP) is described. The STA is configured to use an identifiable medium access control (MAC) random (IRM) address (IRMA) to associate to the AP. The STA comprises first processing circuitry configured to one or both of cause transmission of one IRM key (IRMK) to the AP for each association of a plurality of associations; and receive one IRM key (IRMK) from the AP for each association of a plurality of associations. The first processing circuitry is further configured to determine an IRM hash using the IRMA and an IRMK provided to or received from the AP at an immediately previous association of the plurality of associations; associate to the AP using the IRMA as a transmitted address (TA); cause transmission of an association request including the IRM hash. The AP comprises second processing circuitry configured to check a list of stored IRMKs to find one stored IRMK that together with the IRMA produces the IRM hash included in the association request; and identify the STA by the one IRMK.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 7 is an example table of the values, field names and notes for the IRM Indicator field;

FIG. 8 is table of a set of example Action field values for a set of (IRM) Action frames;

DETAILED DESCRIPTION

A method, "identifiable random MAC (IRM)", and apparatus is disclosed for a STA 120 to indicate to an AP 110, that the MAC address used by the STA 120 is random but also "identifiable" and that while still preventing third parties from tracking the STA 120, a trusted AP 110 can recognize or identify that STA 120.

Figure 1:
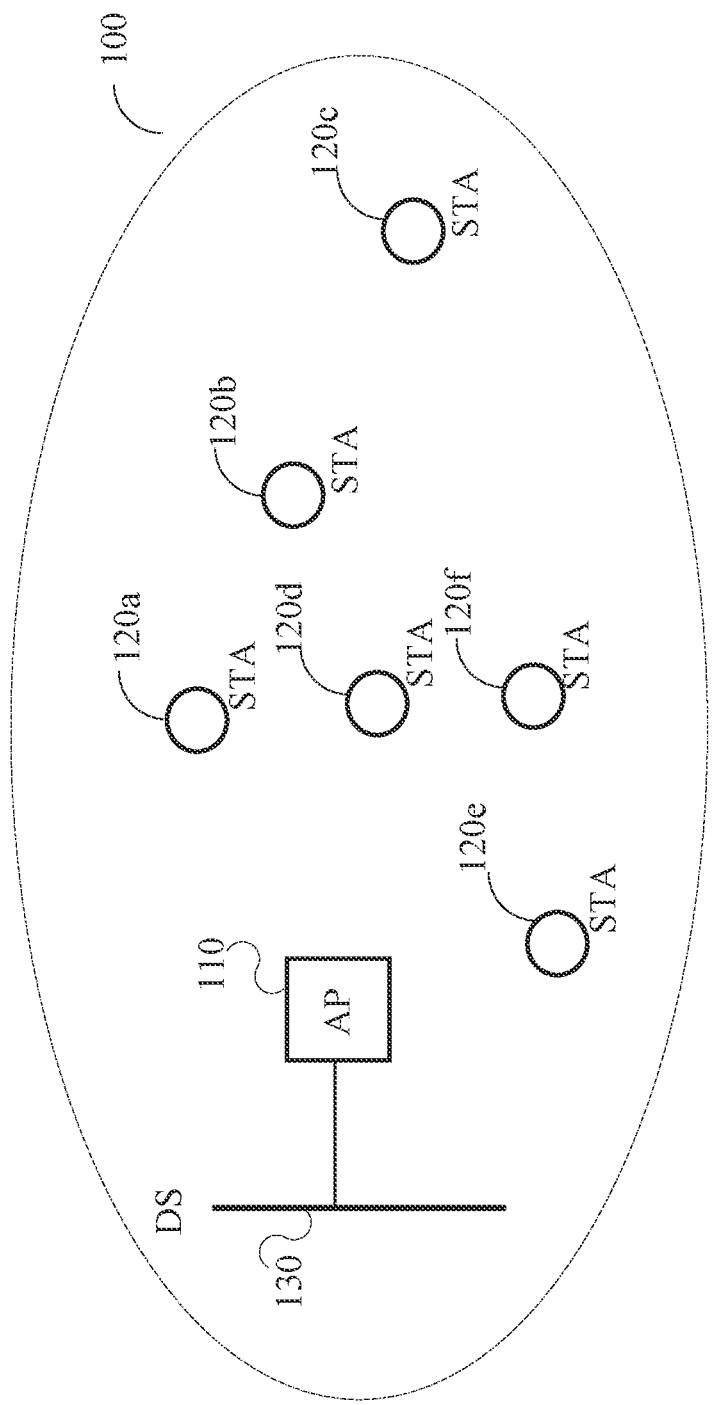
FIG. 1 is a block schematic diagram of a typical IEEE 802.11 infrastructure network.
Figure 2:
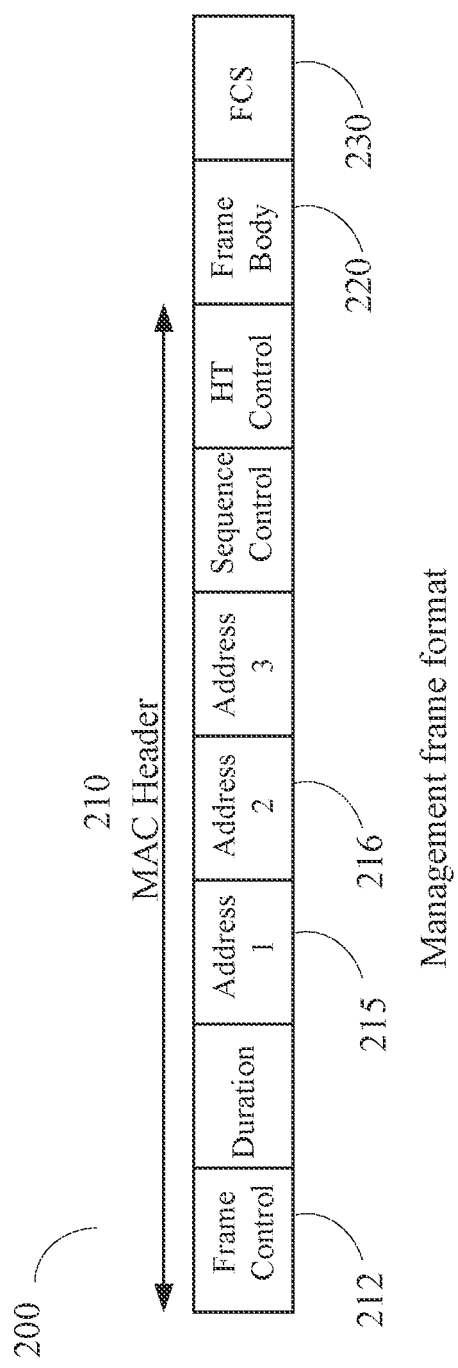
FIG. 2 depicts the IEEE 802.11 Management frame format.
Figure 3:
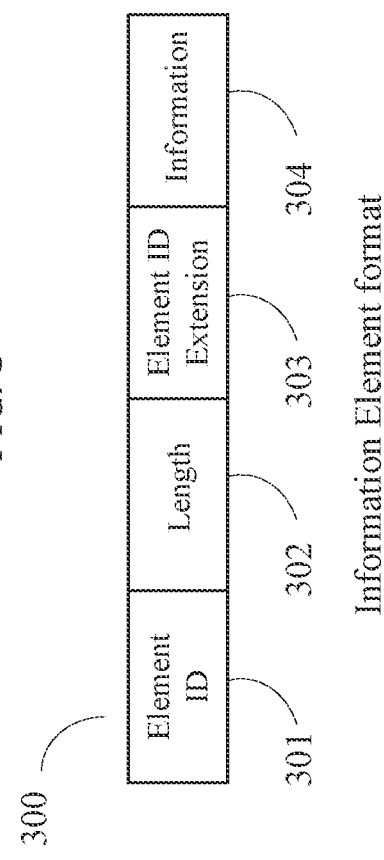
FIG. 3 depicts the format of an Information Element.
Figures 4, 5:
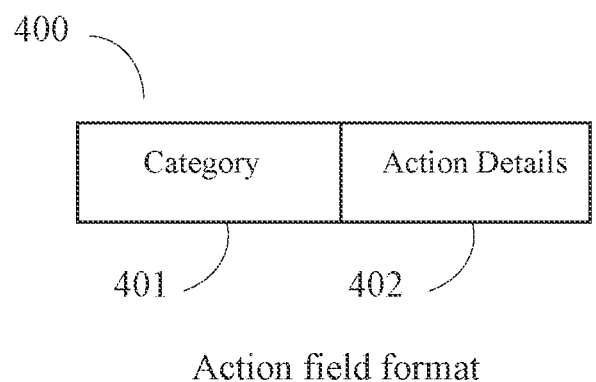
FIG. 4 depicts an example of a Capability bit, identifiable random MAC (IRM) Capability that may be added to the Extended Capabilities Information element.
FIG. 5 depicts an example of an Information element, the IRM element.

Referring again to the drawing figures in which like reference designators refer to like elements, an Association Request management frame has the format shown in FIG. 2. FIG. 3 depicts the format of an Information Element 300. The Information Element 300 comprises Element ID 301, Length 302, Element ID Extension 303 and Information 304 fields. The Frame Body 220 of the Association Request management frame comprises a number of Information Elements each with the format as shown in FIG. 3. FIG. 4 depicts the format of a management Action frame 400 which comprises a Category field 401 and Action field 402. Once associated, an AP 110 and a STA 120 can use management Action frames to communicate with each other A more complete understanding of the present invention, and the attendant advantages and features thereof, will be more readily understood by reference to the following definitions for certain terms used herein:

"identifiable random MAC (IRM)": a method where a non-AP STA uses identifiable random MAC addresses (IRMAs) to prevent third parties from tracking the non-AP STA while still allowing trusted parties to identify the non-AP STA.

"identifiable random MAC address (IRMA)": a randomized MAC address used by a STA using IRM.

"identifiable random MAC key (IRMK)": a key used to resolve an IRMA.

"association" (or to associate) may refer to performing one or more steps (e.g., transmitting/receiving an association request/response) to associate one device with another device (e.g., associate an AP with a STA, or vice versa) such that communication may be established and/or maintained and/or terminated by the devices. In some embodiments, an association may include one or more of the following: a STA may authenticate with an AP, the STA may send an authentication request, the AP may process the authentication request and/or grant the association and/or transmit an authentication response, and/or the STA and/or the AP transmit one or more packets and/or frames (e.g., including data) after being associated. In some embodiments, association refers to "association" as defined in the IEEE 802.11-2020 Standard.

A more complete understanding of the details of the present invention will be more readily understood by first providing an outline of the IRM method, set forth as follows.

Two methods of allocating the IRMK are disclosed: exchange of robust action frames and including key data into message 2 or 4 of the 4-way handshake used to provide and exchange keys during association.

An AP 110 may indicate that it supports IRM by setting an IRM Capability bit in the Extended Capabilities Information element that is transmitted in its Beacons. A STA 120 may indicate that it supports IRM by setting a IRM Capability bit in in the Extended Capabilities Information element that is transmitted in an Association Request frame. When a STA 120 sends an Association Request to an AP 110, it uses an identifiable randomized MAC address, known as an IRMA, as the transmitter address TA. The STA 120 also includes an IRM element in the Association Request. The IRM element may include an IRM Hash. The STA 120 also may indicate in the IRM element whether it has previously associated with the AP 110 or not. If the STA 120 has not previously associated with the AP 110, then, the IRM element does not include an IRM Hash and the TA may be a random MAC address. Then, in one embodiment, once associated, the AP 110 may transmit an IRMK Request Action frame to the STA 120, and the STA 120 may respond with an IRMK Response Action frame which includes an IRMK determined by the STA 120. In another embodiment, STA 120 may include an IRMK in key data in message 2 or 4 of the 4-way handshake. The AP 110 may then store that IRMK as an identifier for that STA 120. If the STA 120 has previously been associated with the AP 110, the IRM element will include an IRM Hash which is derived using the IRMA and an IRMK.

The AP 110 can confirm that a stored IRMK, together with the TA, i.e., IRMA, used by the STA 120, produces the same IRM Hash value that was included in the IRM element sent by the STA 120 in its Association Request. Hence, the AP 110 may identify the STA 120 by the IRMK. Each time the STA 120 associates to the AP 110, the TA, i.e., IRMA, and the IRM Hash value in the Association Request will be different, but the IRMK used to derive the IRM Hash, is the same as the one previously provided to and stored by the AP 110 for that STA 120 and may be used to identify STA 120.

FIG. 5 depicts an example of a Capability bit as a field called IRM Capability in the form of a IRM capability bit 500, that may be added to the Extended Capabilities Information element. An AP 110 may include this IRM Capability bit 500 in the Extended Capabilities Information element in its beacons, e.g., to indicate that the AP 110 supports IRM. A STA 120 may include this IRM Capability bit 500 in the Extended Capabilities Information element in its Association Request frame, e.g., to indicate that the STA 120 supports IRM. The position of the bit in the Extended Capabilities Information element may be assigned by the IEEE 802.11 Working Group Assigned Numbers Authority (ANA). Setting the bit to 0, or omitting the bit, may indicate that IRM is not supported.

Figure 6:
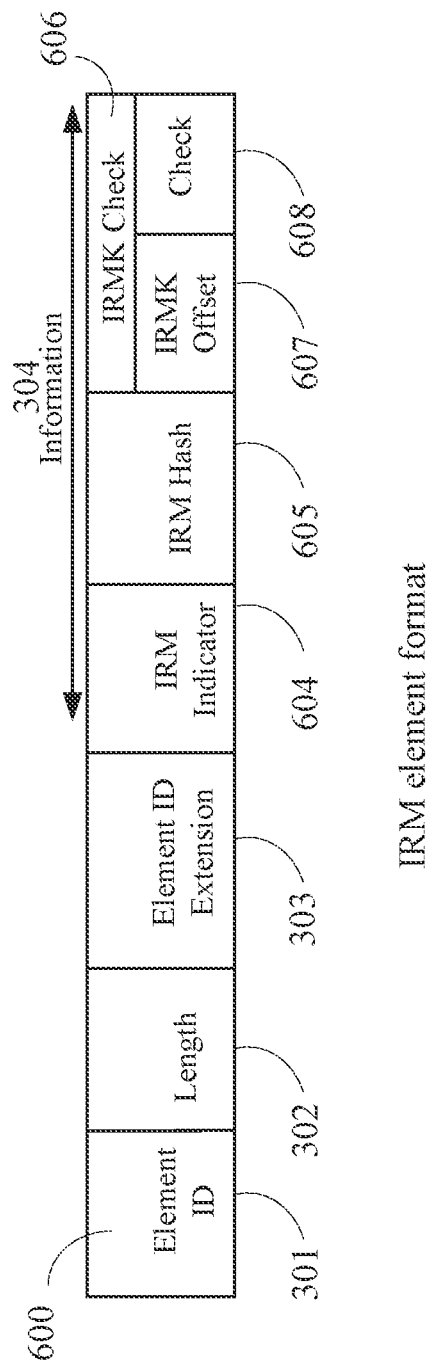
FIG. 6 depicts an example of an Information element.

FIG. 6 depicts an example of an Information element 300, the IRM element 600, which, may include in its Information field 304 the following fields: IRM Indicator field 604, IRM Hash field 605, and IRMK Check field 606. FIG. 7 is an example table 700 of the values, field names and notes for the IRM Indicator field 604. The IRM Indicator field 604 may be used to convey indications from the STA 120 to the AP 110 as shown in FIG. 7, Table 700. The list in Table 700 should not be construed as exhaustive and should be considered as examples of possible indicators.

In some embodiments, the IRM Hash field 605 is a hash function derived from the IRMA and the IRMK. Hash functions may be used for various integrity and authenticity applications. In particular, hash functions may be used for "key derivation functions". A typical usage of such a key derivation function is to take information that is intended to remain private, such as a password or a shared key, and a random number (known as a 'salt') to produce a 'key'. Methods of producing a 'key' by calculating a hash function from a random 'salt' and a shared (i.e., private) key are known and are beyond the scope of this disclosure. In the IRM method and arrangements described in this disclosure, the IRM Hash is a function of the random MAC address (IRMA) and the shared private key, i.e., the IRM key (IRMK). The disclosed method and arrangements provided herein relate to how the IRMK may be securely shared between a STA 120 and an AP 110 and how the STA 120 indicates to the AP 110 that the MAC address (TA), i.e., IRMA, may be interpreted as an identifiable random address. In Wi-Fi networks, and in particular networks that may have a need to identify a STA, the number of STAs may be large. Hence, the identification of many STAs and IRMKs may be needed in addition to the requirement that the identity of a STA and its IRMK is required to be secure.

The IRMK Check field 606 may have two sub fields, IRMK Offset 607 and Check 608. In one embodiment of this disclosure, both the IRMK Offset field 507 and the Check field 608 are 1 octet in length, i.e., 8 bits, but may have any other length. The IRMK Offset field 607 indicates the Nth bit in the IRMK. The Check field then may include the 8 bits of the IRMK b(N) to b(N+7). For example, if N=102, then the Check field 608 comprises b102 to b109 of the IRMK.

In another preferred embodiment of this disclosure, the Check field 508 may include 8 bits representing the exclusive OR logical operation (EX-OR) of the 8 bits of the IRMK, b(N) to b(N+7) with the following 8 bits, b(N+8) to b(N+15).

$$\text{i.e., for } n=0 \text{ to } 7 \text{ } bn=\text{EX-OR }(b_{N+n}, b_{N+n+8}) \tag{1}$$

As an example, if the IRMK Offset field 507 has a value of 102, n=102, then in the Check field 508, b0 is EX_OR of b102 and b110 of the IRMK, and Check field b7 is EX-OR of b109 and b117 of the IRMK.

A STA 120 may advertise support for IRM by setting the IRM Capability bit 500 to 1 in the Extended Capabilities element in Probe Request, Association Request and Reassociation Request frames. A STA 120 may include an IRM element 600 in its Association Request and Reassociation Request frames. An AP 110 may advertise support for IRM by setting the IRM Capability bit 500 to 1 in the Extended Capabilities element in its Beacon and Probe Response frames. For example, to indicate that the STA 120 intends to be identifiable, the STA 120 may set the IRM Indicator field 604 to "Unknown" 720, or "Known" 730. If the STA 120 intends to not be identifiable, the IRM Indicator field 604 may be set to "Private" 710.

Each time the STA 120 associates to an AP 110, the STA 120 sends a new IRMK to the AP 110. The AP 110 can then store that IRMK as an identifier for that STA 120.

When STA 120 associates with an IRMA as the TA and indicates "Known" 730, the IRM element 600 includes an IRM Hash field 605. The IRM Hash field 605 value may be derived from the IRMA (TA) and the IRMK that was provided by STA 120 at the last association with that AP 110. The AP then may calculate (i.e., determine) an IRM Hash value using each of its stored IRMKs and the TA 216 until it finds the IRMK that produces the same IRM Hash field value 605 as that included in the IRM element 600.

A list of IRMKs and STAs 120 may be stored by the AP 110 and used as an identifier for each STA 120 that has previously associated. A STA 120 may store the last IRMK exchanged with a particular AP 110 such that the next time the STA 120 associates to that AP 110, the AP 110 can identify the STA 120.

In one embodiment of this disclosure, a STA 120, that supports IRM, receives beacons from AP 110 indicating that the AP supports IRM. STA 120 may send an Association Request to AP 110 using a randomized MAC address as Address 2 TA 216. If the STA 120 is not associating using an identifiable random MAC address (IRMA) but with a private randomized MAC address, then the IRM Indicator field 604 value in the IRM element 600 in the Association Request frame may be set to "Private" 710, and neither the IRM Hash field 605 nor Check field 606 are present in the IRM element 600.

If the STA 120 is associating using an identifiable random MAC address (IRMA) and STA 120 has not previously provided an IRMK to the AP 110 (i.e., this is the first time that STA 120 is associating to AP 110), then the IRM Indicator field 604 value in the IRM element 600 in the Association Request frame may be set to "Unknown" 720. If the STA 120 has previously provided an IRMK to the AP 110, then the IRM Indicator field 604 value may be set to "Known" 730.

As discussed above with reference to FIG. 6, if a STA 120 associates to an AP 110 using an IRMA, the STA may construct an IRMK and calculate an IRM Hash value for the IRM Hash field 505. The IRM Hash may be a function of the IRMA and the IRMK, e.g.:

$$\text{IRM Hash} = \text{function } \{\text{IRMA, IRMK}\} \qquad (2)$$

In one embodiment of this disclosure, the IRMK and the IRM Hash may each have 128 bits, and the IRM Hash field value is the SHA-256/128 function of the IRMK and the IRMA. SHA-256/128 is the truncated SHA-256 function where the leftmost 128 bits of the 256-bit hash generated by SHA-256 are selected as the truncated 128 bit IRM Hash, hence:

$$\text{IRM Hash} = \text{SHA-256/128 } \{\text{IRMK, IRMA}\} \qquad (3)$$

SHA-256 and SHA-256/128 are known. Many different sizes of the IRMK and the IRM Hash could be used, and there are also several other hash functions that could be used. For example, a key derivation function such as hash-based message authentication code (HMAC)-based Extract-and-Expand Key Derivation Function (HKDF) may be used. In one or more embodiments of the following discussions, the size of the IRM Hash and IRMK are both assumed to be 128 bits each. However, these values should not be construed as limitations on the scope, and many other variations are possible. In yet another embodiment, with reference to equations (2) and (3), a third term may be added to the IRM Hash function that is temporal. For example, the temporal term may be based upon the timestamp of a recent beacon frame.

As discussed above with reference to FIG. 6, an IRMK Check field 606 may be added to the IRM element 600. In an embodiment, as discussed above with reference to equation (1), if the IRMK Offset field 607 has a value N, the Check field 608 may contain the 8 bits representing the EX-OR of the 8 bits of the IRMK, $b_N$ to $b_{N+7}$ with the following 8 bits, $b_{N+8}$ to $b_{N+15}$. For 16 bits, there are $2^{16}$ combinations, and for the 8 bits in the Check field, there are $2^8$ combinations. Therefore, there are $2^{(16-8)}=2^8=256$ combinations of the 16 bits, bN to bN+15, that will produce the 8 bits that are in the Check field 508. Hence, the IRMK Check field 506 can reduce the list of stored IRMKs by a factor of 256. For example, if an AP 110 has a stored list of 1000 IRMKs, then using the IRM Check field can result in the list of 100 being reduced to about 4, and hence the correct IRMK may be found with just an average of 2 calculations. It should be noted, however, that the integrity of the IRMK is reduced from 128 bits to 120 bits. As the IRMK is changed on every association, the integrity of the IRMK is not required to be over stringent, and the major concern is duplication. Hence, the IRMK could safely comprise fewer bits than 128.

In one embodiment of this disclosure, a set of (IRM) action frames may be used for the STA 120 to provide the IRMK to the AP 110.

FIG. 8 shows a table 800 of a set of example Action field 402 values for a set of (IRM) Action frames. This list/table should not be construed as exhaustive. Example formats for each of the IRM Action frames depicted in Table 800 of FIG. 8 are shown in FIG. 9, IRMK Request Action frame 900, and FIG. 10, IRMK Response Action frame 1000.

Figure 9:
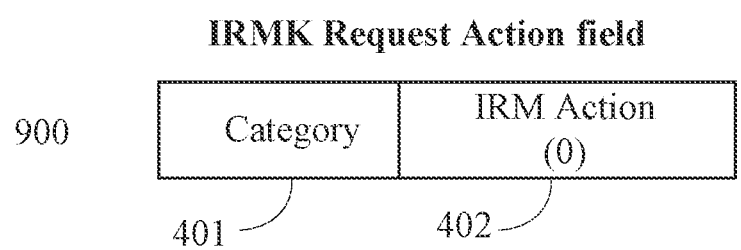
FIG. 9 depicts the IRMK Request Action frame.

FIG. 9 depicts the IRMK Request Action frame 900 which comprises the Category field 401 and the IRM Action field 402. The IRM Action field 402 takes the respective value as shown in Table 800. Hence, the IRM Action field 402 value is 0 in the IRMK Request Action frame 900.

Figure 10:
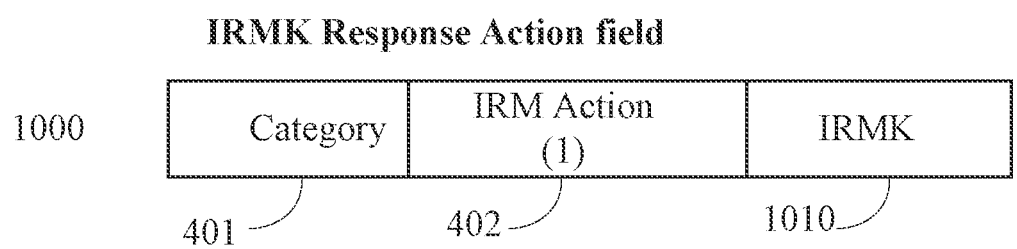
FIG. 10 depicts the IRMK Response Action frame.

FIG. 10 depicts the IRMK Response Action frame 1000 which comprises the Category field 401, the IRM Action field 402 and the IRMK 1010 field. The IRMK field 1010 includes the value of the IRMK that, together with the IRMA, is used to derive the IRM Hash as described above with reference to equations (2) and (3). The IRM Action field 402 value is 1 in the IRMK Response Action frame 1000.

To indicate that the STA 120 intends to be identifiable, an IRM Hash field 605 is included in the IRM element 600 sent in an Association Request and a Reassociation Request. If the STA 120 intends to not be identifiable, then in the IRM element 600, the IRM Indicator field 604 is set to "Private" 710, and neither the IRM Hash field 605 nor the IRMK Check field 606 is present.

If a STA 120 associates to an AP 110 using an IRMA and the IRM Indicator field 604 is set to "Unknown" 720, then, once STA 120 is associated, the AP 110 may transmit an IRMK Request Action frame 900, to STA 120 and STA 120 may then send an IRMK Response Action frame 1000 to the AP 110 that includes an IRMK 1010. The AP 110 may then store that IRMK and use it as an identifier for STA 120. The STA 120 may also store the IRMK used for AP 110.

If an STA 120 associates to an AP 110 using an IRMA and the IRM Indicator field 604 is set to "Known" 730, the STA may include in the IRM element 600 the IRM Hash field 605 and also include the IRMK Check field 606. Including the IRMK Check field 606 can aid (e.g., be usable to) the AP 110 in down-selecting the stored IRMKs, e.g., in the case that the AP 110 has many stored IRMKs. The AP 110 may, prior to completion of the STA 120 association, check the stored IRMKs in order to determine the IRMK that, together with the IRMA, produces the IRM Hash field 605 value that the STA 120 included in the IRM element 600. Alternatively, the AP 110 may, after STA 120 has associated, check the stored IRMKs in order to determine the IRMK that, together with the IRMA, produces the IRM Hash field 605 value that the STA 120 included in the IRM element 600.

When STA 120 is associated, AP 110 may transmit an IRMK Request Action frame 1200 to STA 120. On receipt of a IRMK Request Action frame 1200, STA 120 may then respond with an IRMK Response Action frame 1000 with a new IRMK. Changing the IRMK every association provides higher security and deters any listening station from attempting to find the IRMK.

In another embodiment of this disclosure, the IRMK is inserted in key data is inserted in a message in the 4-way handshake.

Figure 11:
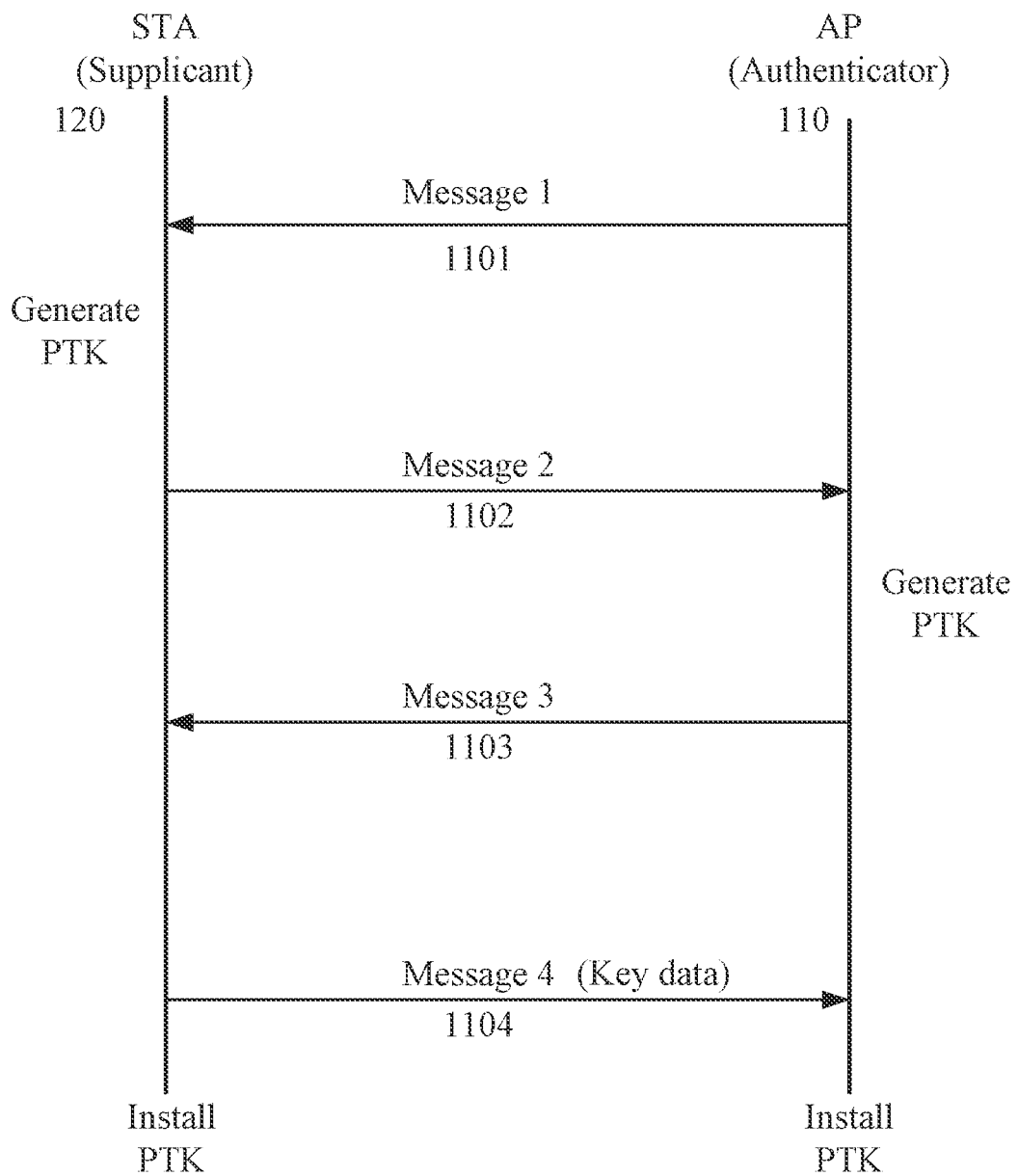
FIG. 11 is a diagram of examples of the messages exchanged during the four-way handshake that occurs when a STA associates with an AP using robust secure network association.

FIG. 11 is a diagram of examples of the messages that may be exchanged during the 4-way handshake that occurs when a STA 120 associates with an AP 110 using robust secure network association RSNA. The 4-way handshake is specified in detail in the Standard; hence, only an outline of the procedure is described herein. Both the STA 120 and the AP 110 share a pairwise master key PMK, i.e., the network "password". The handshake starts when AP 110 sends message 1 1101 to the STA 120 which STA 120 uses to generate a pairwise transient key, PTK. STA 120 then sends message 2 1102 to AP 110 with information such that AP 110 can also generate the PTK. AP 110 then sends message 3 1103 that includes the group temporal key GTK to STA 120 and message 4 1104 is sent by STA 120 to AP 110 to confirm that the keys PTK and GTK have been installed. In message 2 702 and/or message 4 704, the STA 120 may include a "Key Data" field which is a variable length field used to include additional data. This Key Data field is protected.

Figure 12:
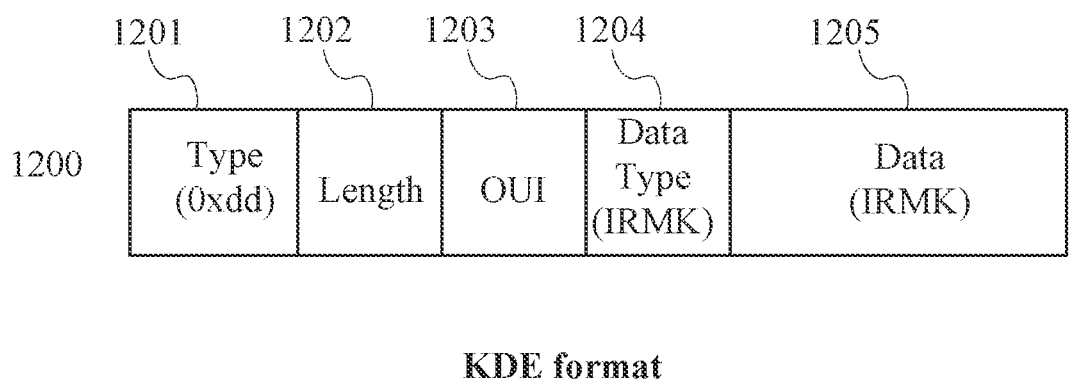
FIG. 12 depicts an example of a key data encapsulation (KDE) format, IRMK KDE.

FIG. 12 depicts an example of a key data encapsulation (KDE) frame 1200, e.g., IRMK KDE. The Type field 1201 is set to 0xdd as specified in the Standard for KDEs. The Length field 1202 specifies the number of octets in the following fields 1203, 1204 and 1205. As specified in "Table 12-9—KDE selectors" in the Standard, the organizational unique identifier (OUI) field is set to 00-0F-AC. The data type field 1204 is used to define the meaning of the KDE. A new data type may be assigned with associated meaning "IRMK", i.e., a new data type may be added to Table 12-9—KDE selectors in the Standard. In cases where the KDE is used for the allocation of the IRMK, the data type field 1204 is set to a value that indicates this is a IRMK KDE, and the IRMK subfield 1205 includes the new IRMK. As discussed above with reference to FIG. 11, the IRMK KDE may be included in message 2 1102 or message 4 1104 of the 4-way handshake, and hence, the STA 120 may provide a new IRMK to the AP 110 in a secure manner in every association.

Figure 13:
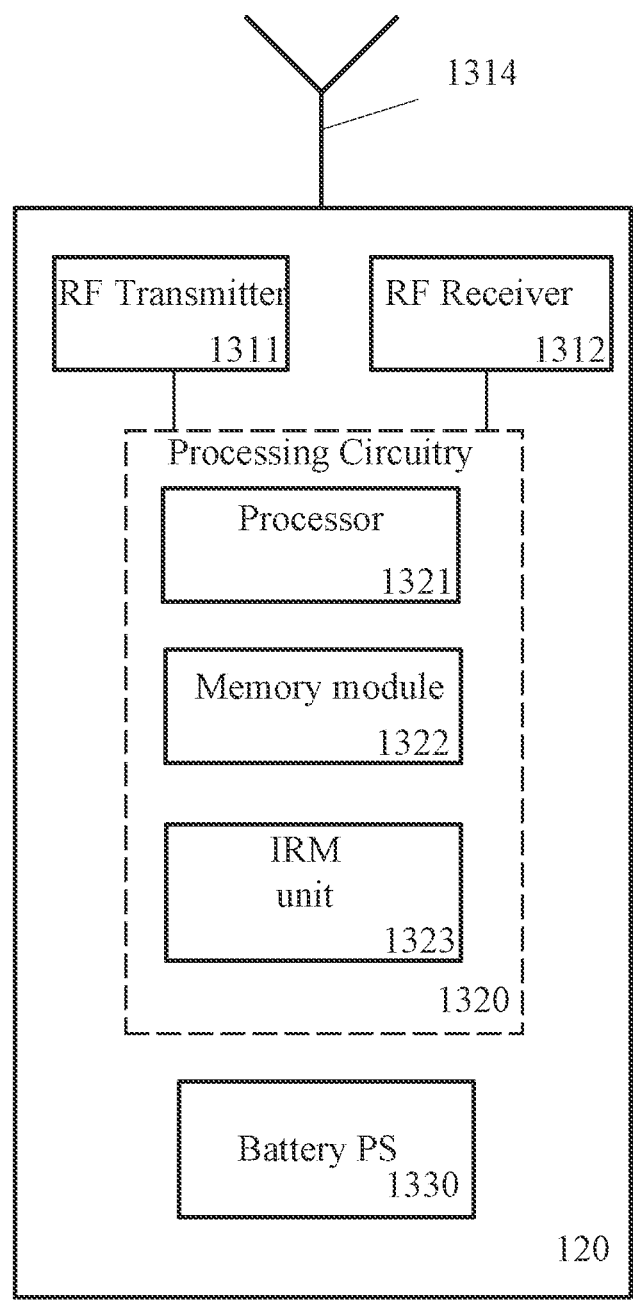
FIG. 13 illustrates an example of a mobile station (STA), according to embodiments of the present disclosure.

FIG. 13 illustrates an example of a mobile station (STA) 120, according to embodiments of the present disclosure. Mobile station 120 may be a wireless device that is based upon the IEEE 802.11 specification. In one embodiment, mobile station STA 120 may include an antenna assembly 1314, a radio frequency (RF) receiver 1312, an RF transmitter 1311, processing circuitry 1320 and a battery powered power supply 1330. The antenna assembly 1314 may comprise several antennas such that STA 120 may transmit and receive signals in the various frequency bands covered by the IEEE 802.11 specification and enable features such as multiple input multiple output (MIMO) and beamforming. The RF receiver 1312 may receive radio frequency (RF) signals from the antenna assembly 1314. The RF receiver 1312 may comprise one or more receiver paths. The RF receiver 1312 may perform the usual functions of an RF receiver such as low noise amplification, filtering, and frequency down conversion so as to condition the received signal suitable for inputting to the processing circuitry 1320. The processing circuitry 1320 may perform the usual baseband functions such as demodulation, descrambling, and error correction of received packets as described in the Standard and may also perform the functions required by IRM for a STA 120 as described in this disclosure. The RF transmitter 1311 may comprise one or more transmitter paths. The RF transmitter 1311 may perform the usual functions of an RF transmitter such as up conversion, filtering and power amplification of the baseband signal received from the processing circuitry 1320. The processing circuitry 1320 may perform the usual baseband functions such as coding, scrambling and modulation of packets to be transmitted as described in the Standard.

The processing circuitry 1320 may include a processor 1321, a memory 1322, and the IRM unit 1323. In addition to a traditional processor and memory, processing circuitry 1320 may comprise integrated circuitry for processing and/or control, e.g., one or more processors and/or processor cores and/or FPGAs (Field Programmable Gate Array) and/or ASICs (Application Specific Integrated Circuitry). Processor 1321 may be configured to access (e.g., write to and/or reading from) memory 1322, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 1322 may be configured to store code executable by processor 1321 and/or other data, e.g., data pertaining to communication, e.g., configuration and/or address data of nodes, etc. In some embodiments, the IRM unit 1323 may be implemented by the processor and/or the memory module 1322.

Processing circuitry 1320 may be configured to control any of the methods and/or processes described herein and/or to cause such methods and/or processes to be performed, e.g., by mobile station STA 120. Corresponding instructions may be stored in the memory 1322 and/or in the IRM unit 1323, which may be readable and/or readably connected to processor 1321. In other words, processing circuitry 1320 may comprise a microprocessor and/or microcontroller and/or FPGA (Field-Programmable Gate Array) device and/or ASIC (Application Specific Integrated Circuit) device. The IRM unit 1323 may be configured to perform one or more IRM processes described herein, such as determining values for use as IRMKs, performing the computations for the IRM Hash, and writing to the memory 1322 for the storage of the allocated IRMKs and their corresponding APs.

Figure 14:
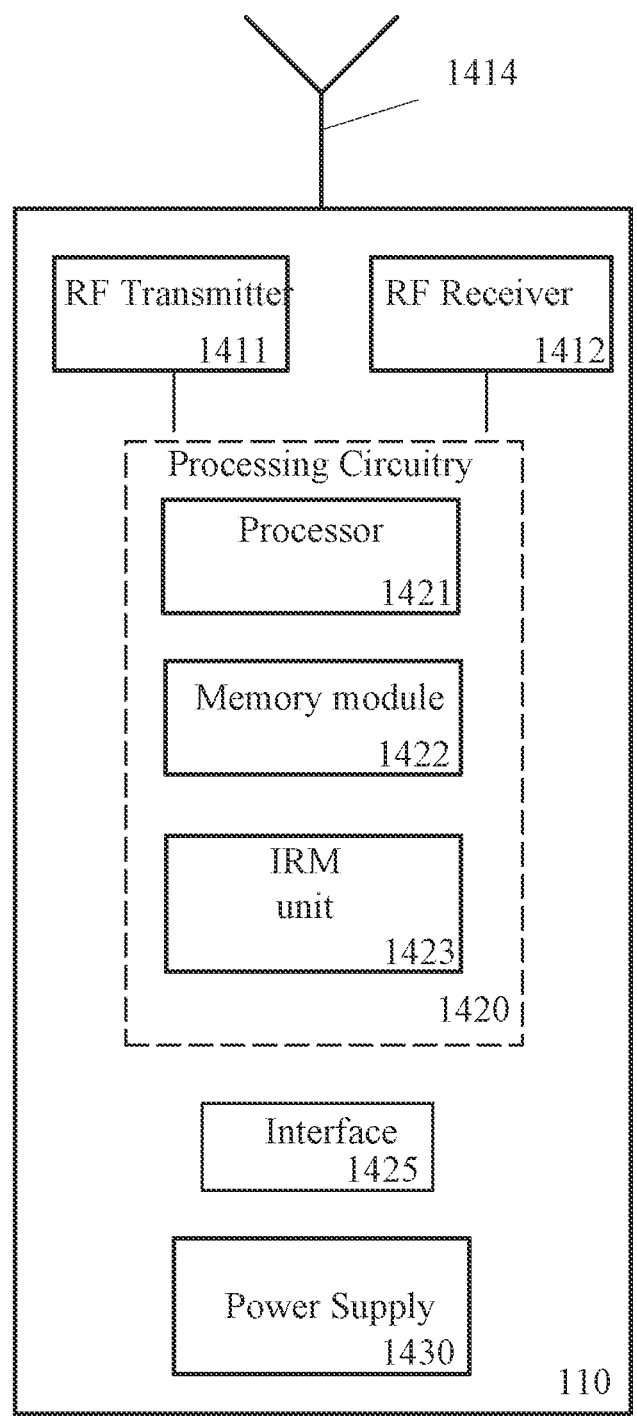
FIG. 14 illustrates an example of an access point AP, according to embodiments of the present disclosure.

FIG. 14 illustrates an example of an access point AP 110, according to embodiments of the present disclosure. AP 110 may be a wireless device that is based upon the IEEE 802.11 specification. In one embodiment, AP 110 may include an antenna assembly 1414, a radio frequency (RF) receiver 1412, an RF transmitter 1411, processing circuitry 1420, an interface 1425 and a power supply 1430. Interface 1425 may connect the processing circuitry 1420 via Ethernet to the DS 130. Antenna assembly 1414 may comprise several antennas such that AP 110 may transmit and receive signals in the various frequency bands covered by the 802.11 specification and enable features such as multiple input multiple output (MIMO) and beamforming. The RF receiver 1412 may receive radio frequency (RF) signals from the antenna assembly 1414. The RF receiver 1012 may comprise one or more receiver paths. The RF receiver 1412 may perform the usual functions of an RF receiver such as low noise amplification, filtering, and frequency down conversion so as to condition the received signal suitable for inputting to the processing circuitry 1420. The processing circuitry 1420 may perform the usual baseband functions such as demodulation, descrambling, and error correction of received packets as described in the Standard and may also perform the functions required by an AP 110 for IRM as described in this disclosure. The RF transmitter 1411 may comprise one or more transmitter paths. The RF transmitter 1411 may perform the usual function of an RF transmitter such as up conversion, filtering and power amplification of the baseband signal received from the processing circuitry 1420. The processing circuitry 1420 may perform the usual baseband functions such as coding, scrambling and modulation of packets to be transmitted as described in the Standard.

The processing circuitry 1420 may include a processor 1421, a memory 1422, and the IRM unit 1423. In addition to a traditional processor and memory, processing circuitry 1420 may comprise integrated circuitry for processing and/or control, e.g., one or more processors and/or processor cores and/or FPGAs (Field Programmable Gate Array) and/or ASICs (Application Specific Integrated Circuitry). Processor 1421 may be configured to access (e.g., write to and/or reading from) memory 1422, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 1422 may be configured to store code executable by processor 1421 and/or other data, e.g., data pertaining to communication, e.g., configuration and/or address data of nodes, etc. In some embodiments, the IRM unit 1423 may be implemented by the processor and/or the memory module 1422.

Processing circuitry 1420 may be configured to control any of the methods and/or processes described herein and/or to cause such methods and/or processes to be performed, e.g., by AP 110. Corresponding instructions may be stored in the memory 1422, and/or the IRM unit 1423 which may be readable and/or readably connected to processor 1421. In other words, processing circuitry 1420 may comprise a microprocessor and/or microcontroller and/or FPGA (Field-Programmable Gate Array) device and/or ASIC (Application Specific Integrated Circuit) device. The IRM unit 1423 may be configured to perform one or more IRM processes described herein, such as computation of the IRM Hash and writing to the memory 1022 for the storage of the allocated IRMKs and their corresponding STAs.

Note that the modules discussed herein may be implemented in hardware or a combination of hardware and software. For example, the modules may be implemented by a processor executing software instructions or by application specific integrated circuitry configured to implement the functions attributable to the modules. Also note that the term "connected to" as used herein refers to "being in communication with" and is not intended to mean a physical connection nor a direct connection. It is contemplated that the signal path between one element and another may traverse multiple physical devices.

Thus, in some embodiments, the processing circuitries 1320 and 1420 may include the memory 1322 and 1422 respectively, a processor 1321 and 1421 respectively, the memories 1322 and 1422 containing instructions which, when executed by the processors 1321 and 1421 respectively, configure the processor 1321 or 1421 to perform the one or more functions described herein. Similarly, in some embodiments, the processing circuitries 1320 and 1420 may include the memory 1322 and 1422 respectively, an IRM unit 1323 and 1423 respectively, the memories 1322 and 1422 containing instructions which, when executed by the IRM units 1323 and 1423 respectively, configure the processor 1321 or 1421 to perform the one or more functions described herein. In addition to a traditional processor and memory, the processing circuitries 1320 and 1420 may comprise integrated circuitry for processing and/or control, e.g., one or more processors and/or processor cores and/or FPGAs (Field Programmable Gate Array) and/or ASIC s (Application Specific Integrated Circuitry).

The processors 1321 and 1421 may include and/or be connected to and/or be configured for accessing (e.g., writing to and/or reading from) the memories 1322 and 1422 respectively, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 1322 and 1422 may be configured to store code executable by control circuitry and/or other data, e.g., data pertaining to communication, configuration and/or address data of nodes, etc. The processing circuitry 1320 and 1420 may be configured to control any of the methods described herein and/or to cause such methods to be performed, e.g., by the processors 1321 and 1421 or by the IRM units 1323 and 1423. Corresponding instructions may be stored in the memory 1322 or 1422, which may be readable and/or readably connected to the processing circuitry 1320 or 1420. In other words, the processing circuitries 1320 and 1420 may include a controller, which may comprise a microprocessor and/or microcontroller and/or FPGA (Field-Programmable Gate Array) device and/or ASIC (Application Specific Integrated Circuit) device. It may be considered that the processing circuitries 1320 and 1420 include or may be connected or connectable to memory, which may be configured to be accessible for reading and/or writing by the controller and/or processing circuitry 1320 or 1420.

According to an embodiment of the disclosure, STA 120 is arranged to receive transmissions of another wireless device such as AP 110, and processing circuitry 1320 is arranged to monitor attributes of those transmissions. For example, processing circuitry 1320 or IRM unit 1323 may be arranged to monitor attributes of beacon transmissions of AP 110 and determine that AP 110 supports IRM by examination of the Extended Capabilities field in the Beacon and determining that the IRM capability bit is set therein. Furthermore, IRM unit 1323 in processing circuitry 1320 in STA 120 is arranged to calculate a value for the IRM Hash field 605 and the values for the IRMK Check field 606. STA 120 is arranged to transmit to AP 110 an Association Request frame that includes an IRM element 600 and processing circuitry 1320 may be arranged to determine the individual field values for that element, such as Element ID 301, Length 302, Element ID Extension 303, IRM Indicator field 604, IRM Hash field 605, and IRMK Check field 606. According to another embodiment of the disclosure, AP 110 is arranged to monitor the Association Request frame from STA 120, that includes an IRM element 600 and processing circuitry 1420 may be arranged to detect the individual fields of the Association Request frame and take the appropriate action as described herein. The processing circuitry 1420 in AP 110 may be arranged to check through stored IRMKs to find the IRMK that produces the same IRM Hash value that is contained in the IRM Hash field 605 in the Association Request sent by STA 120. The IRM unit 1423 in processing circuitry 1420 in AP 110 may also be arranged to check through stored IRMKs to first find the IRMKs that satisfy the down-selection process as discussed above with reference to FIG. 6 using the values in the IRMK Check field 606. Memory 1422 in AP 110 may be arranged to store IRMKs together with an identifier for each STA that has associated using an IRMA. Similarly, memory 1322 in STA 120 may be arranged to store the IRMKs that it provided when last associating to each AP 110.

According to an embodiment of the disclosure, STA 120 and AP 110 are arranged to be capable of carrying out the function of association, as described in the Standard, and to communicate with each other, securely, once associated. In one embodiment of this disclosure, once associated, STA 120 and AP 110 are arranged to exchange Action frames 400 and their processing circuitries 1320 and 1420 are particularly arranged to exchange and interpret the IRMK Request 900 and IRMK Response Action frames 900 and 1000 respectively, the details of which are discussed above with reference to FIGS. 9 and 10.

In another embodiment of this disclosure, STA 120 and AP 110 are arranged to carry out the 4-way handshake as discussed above with reference to FIG. 11. STA 120 is arranged to be capable of inserting an IRMK KDE frame 1200 into message 2 1102 or message 4 1104 of the 4-way handshake as discussed above with reference to FIG. 11, and AP 110 is arranged to recognize and decode the IRMK KDE frame 1200 and in particular the IRMK subfield 1205.

Figure 15:
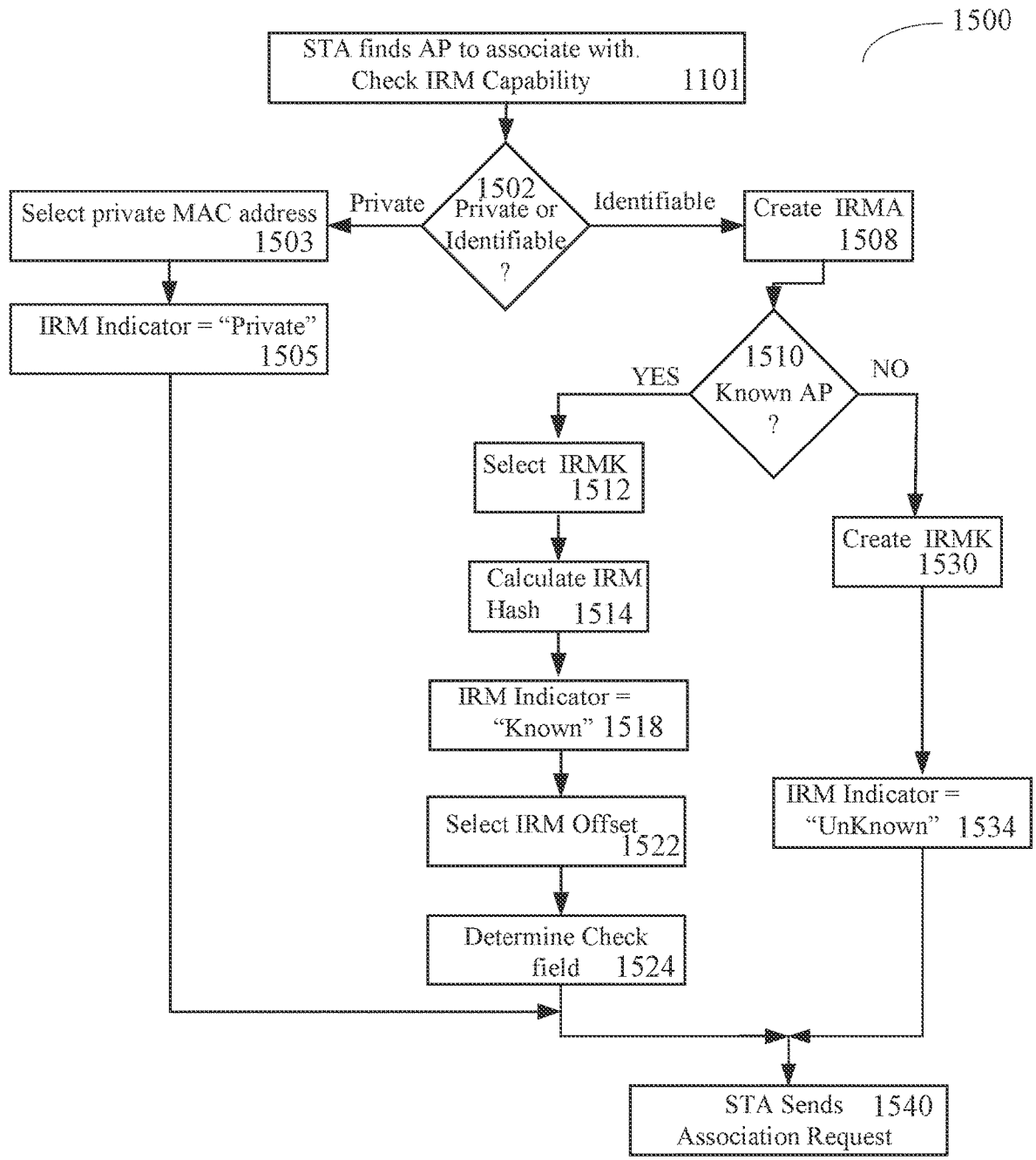
FIG. 15 is an example flow diagram illustrating an embodiment of the method of the present disclosure, when a STA is preparing to associate to an AP.

FIG. 15 is an example flow diagram 1500 illustrating an embodiment of the method of the present disclosure when STA 120 is preparing to associate to AP 110. Both STA 120 and AP 110 have set the IRM Capability bit 500 in their Extended Capabilities fields as discussed above with reference to FIG. 5. The method of flow diagram 1500 may start with step 1501 where STA 120 receives beacons from AP 110, checks the attributes and decides to associate. At step 1502, STA 120 may make a decision as to whether to use a private random MAC address, or an identifiable random MAC address (IRMA), as discussed above with reference to FIG. 7. As an example, even though the AP 110 supports IRM, a user setting may have been set that instructs the STA 120 to use a private random MAC address. If, at step 1502, STA 120 has chosen to use a private address, then in step 1503, STA 120 selects or calculates a private random MAC address, and, at step 1505, sets the IRM Indicator field 604 in the IRM element 600 to "Private" 710. STA 120 does not include the IRM Hash field 605 or the IRMK Check field 606 in the IRM element 600. At step 1540 STA 120 may send an Association Request to AP 110 using the MAC address selected in step 1503 as the TA.

If, at step 1502, STA 120 has chosen to use an identifiable address, then at step 1508 STA 120 constructs an identifiable random MAC address (IRMA). The IRMA may consist of 46 random bits with the least significant bit of the first octet, the "I/G" bit, set to 0 (unicast) and the second least significant bit of the first octet, the "U/L" bit, set to 1 (locally administered) as specified in the Standard. At step 1510, STA 120 may check if AP 110 is an AP that STA 120 has previously associated to and has previously exchanged an IRMK with. If so, then step 1510 may be followed by step 1512 where STA 120 may select the IRMK that it allocated to AP 110 in its last association. STA 120 may store a list of APs and IRMKs in memory 1422, and IRM unit 1423 may be arranged to search through that list to determine if AP 110 and an associated IRMK is present. In step 1514, STA 120 may calculate the IRM Hash value as discussed above with reference to equations (2) and (3), using the IRMK selected in step 1512 and the IRMA created in step 1508. The IRM Hash calculation may take place in the IRM unit 1423 of the processing circuitry 1420, and the IRM Hash field 605 value in the IRM element 600 is set to the result of that calculation. STA 120, at step 1518, may set the IRM Indicator field 604 in the IRM element 600 to "Known" 730. In step 1522, STA 120 may select the value for the IRM Offset field 607, and then in step 1524, determine the values for the Check field 608 as described above with reference to FIG. 6 and equation (1), from the IRMK selected in step 1512. This determination of the check field 608 value may be carried out by the IRM unit 1423 in the processing circuitry 1420. The IRM Check field 606 in the IRM element 600 is set to the results of the IRM Offset field 507 selection and the determination of the Check field 608. At step 1540, STA 120 may then send an Association Request to AP 110 that includes an IRM element 600 using the IRMA MAC address selected in step 1508 as the TA.

If, at step 1510, STA 120 determines that AP 110 is an AP that STA 120 has not previously associated to and has not previously exchanged an IRMK with, then, if robust action frames are to be used, as discussed below with reference to FIG. 16, at step 1530, STA 120 may create an IRMK which may be used as an identifier for STA 120 with AP 110. If, however, a KDE is used, as discussed below with reference to FIG. 17, then only if the STA 120 provides the IRMK may STA 120 create an IRMK which may be used as an identifier for STA 120 with AP 110. If the AP 110 provides the IRMK, then step 1530 is omitted. STA 120 may store a list of APs and IRMKs in memory 1422 and IRM unit 1423 may be arranged to search through that list to determine that AP 110 is not present. Then, at step 1534, STA 120 may set the IRM Indicator field 604 in the IRM element 600 to "Unknown" 720. The IRMK Check field 606 and the IRM Hash field 605 are not included in the IRM element 600. Step 1534 may be followed by step 1540 where STA 120 sends an Association Request frame to AP 110 that includes an IRM element 600 using the IRMA MAC address selected in step 1508 as the TA. The Association Request frame may be constructed by processing circuitry 1420 and then transmitted via RF transmitter 1411 and antenna assembly 1414.

Figure 16:
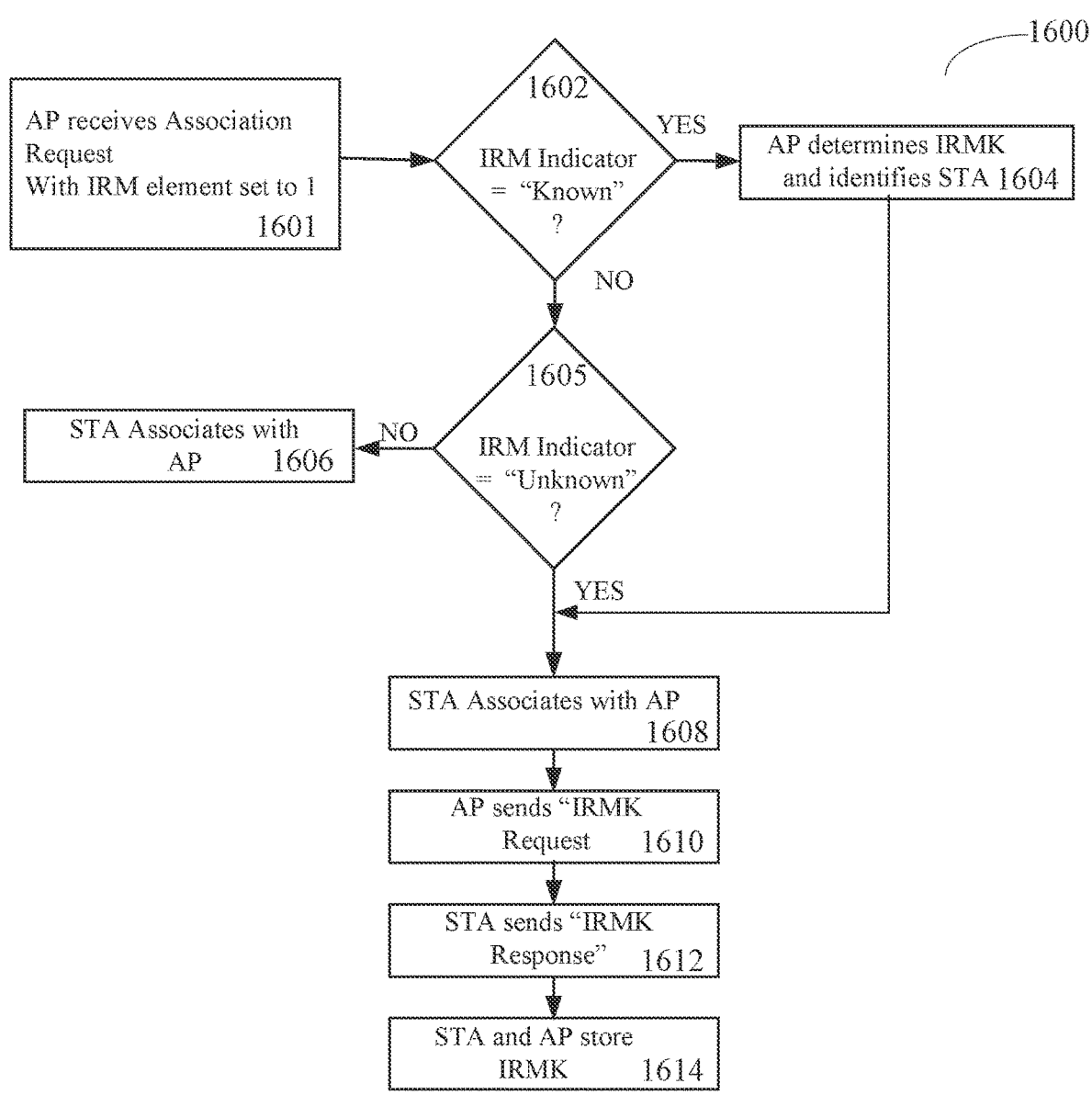
FIG. 16 is an example flow diagram illustrating an embodiment of the method of the present disclosure using robust action frames, when STA associates to AP.

FIG. 16 is an example flow diagram 1600 illustrating an embodiment of the method of the present disclosure using robust action frames, when STA 120 associates to AP 110. Method 1600 may start with step 1601 where AP 110 receives an Association Request from STA 120 that includes an IRM element 500 that was constructed as discussed above with reference to FIG. 15. At step 1602, AP 110 may check if the IRM element 600 includes an IRM Indicator field 604 with value "Known" 730. If so, then, at step 1604, AP 110 may start checking through its list of IRMKs and STAs and performing the calculations (e.g., as discussed above with reference to equations (2) and (3)), in order to find a stored IRMK that together with the IRMA (used as the TA in the Association Request) produces the same IRM Hash value as the IRM Hash field 605 value in the IRM element 600. AP 110 may use the values of the IRMK Offset field 607 and Check field 608, if included in the IRM element 600, to down select the IRMKs it may have stored, as discussed above with reference to FIG. 6. Having determined an IRMK that does match the IRM Hash, AP 110 has identified STA 120. IRM unit 1323 in processing circuitry 1320 may be arranged to carry out the IRM Check calculations as well as the IRM Hash calculations using a list of IRMKs and STAs stored in memory 1322. At step 1608, STA 120 may associate with AP 110. Once associated, at step 1608, AP 110 may send an IRMK Request packet 900 to STA 120, and at step 1612, STA 120 may send an IRMK Response packet 1000 which includes a new IRMK 1010. At step 1614, AP 110 may store the new IRMK received at step 1612, in memory module 1322 and STA 120 may store the IRMK in memory module 1422.

If, at step 1602, the IRM indicator 604 was not "Known" 730, then at step 1605, it may be checked if the IRM Indicator 604 is "Unknown" 720, and if so then the process advances to step 1608. If, at step 1605, the IRM Indicator 604 is not "Unknown", then it may be assumed that the IRM Indicator 604 is "Private" 710, and at step 1606, STA 120 associates using a private random address.

Figure 17:
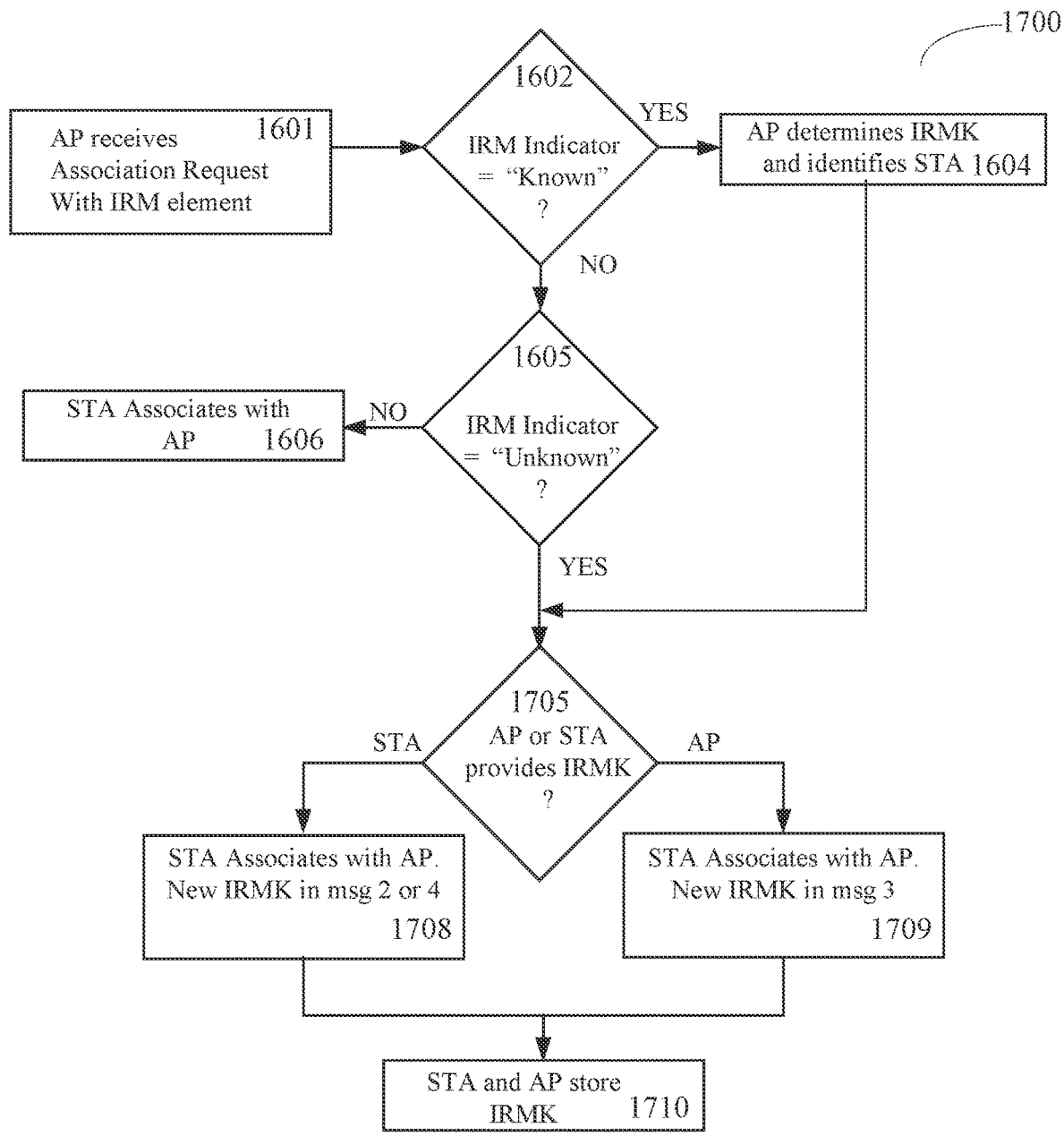
FIG. 17 is an example flow diagram illustrating an embodiment of the method of the present disclosure using a KDE, when STA associates to AP.

FIG. 17 is an example flow diagram illustrating an embodiment of the method of the present disclosure using a KDE, when STA 120 associates to AP 110. Method 1700 is similar to method 1600 but differs in that steps 1705 and 1708 replace steps 1608, 1610, 1612 and 1614. Method 1700 also provides for either the STA 120 or the AP 110 to provide the IRMK. Method 1700 may start with step 1601 where AP 110 receives an Association Request from STA 120 that includes an IRM element 500 that was constructed as discussed above with reference to FIG. 15. At step 1602, AP 110 may check if the IRM element 600 includes an IRM Indicator field 604 with value "Known" 730. If so, then, at step 1604, AP 110 may start checking through its list of IRMKs and STAs and performing the calculations (e.g., as discussed above with reference to equations (2) and (3)) in order to find a stored IRMK that together with the IRMA (used as the TA in the Association Request) produces the same IRM Hash value as the IRM Hash field 605 value in the IRM element 600. AP 110 may use the values of the IRMK Offset field 607 and Check field 608 if included in the IRM element 600 to down select the IRMKs it may have stored, as discussed above with reference to FIG. 6. Having determined an IRMK that does match the IRM Hash, AP 110 has effectively identified STA 120. IRM unit 1323 in processing circuitry 1320 may be arranged to carry out the IRM Check calculations as well as the IRM Hash calculations using a list of IRMKs and STAs stored in memory 1322. If the pre-setting is that the IRMK is provided by the STA 120, then at step 1708, STA 120 may associate with AP 110, and in message 2 or message 4 of the 4-way handshake, STA 120 will include an IRMK KDE frame 1200 that includes a new IRMK subfield 1205. If the pre-setting is that the IRMK is provided by the AP 110, then at step 1709, STA 120 may associate with AP 110, and in message 3 of the 4-way handshake, AP 110 will include an IRMK KDE frame 1200 that includes a new IRMK subfield 1205. At step 1710, both AP 110 and STA 120 may store the new IRMK received at either step 1708 or step 1709 in memory modules 1322 and 1422 respectively. If at step 1602 the IRM indicator 504 was not "Known" 630, then at step 1605, it may be checked if the IRM Indicator 604 is "Unknown" 720, and if so, then the process advances to step 1610. If at step 1605 the IRM Indicator 604 is not "Unknown", then it may be assumed that the IRM Indicator 604 is "Private" 710 and at step 1606 STA 120 associates using a private random address.

If STA 120 sends directed probe requests to AP 110, STA 120 may, if it has an IRMK stored at that AP 110, include an IRM element in the probe request. STA 120 may use a different IRMA and IRM Hash for each probe request and AP 110 should be able to identify STA 120. As the IRMA (TA) and IRM Hash change each probe request, tracking the STA is made almost impossible. Similarly, if STA 120 sends a broadcast probe and AP 110 receives it, then AP 110 should be able to identify STA A 120.

Figure 18:
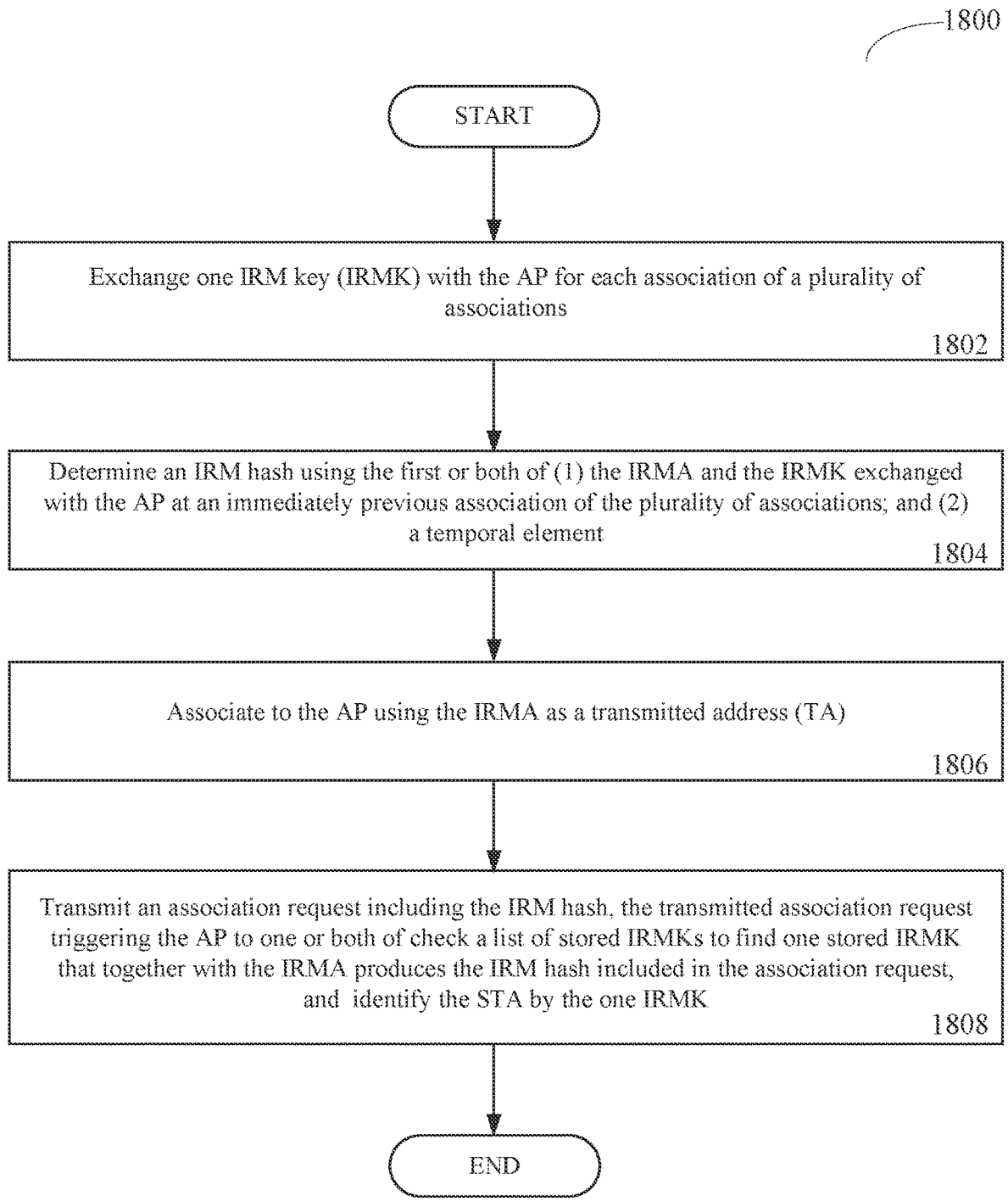
FIG. 18 shows another example flow diagram (e.g., in an STA 120).

FIG. 18 shows an example flow diagram (e.g., in an STA 120) illustrating an embodiment of the method of the present disclosure. One or more blocks described herein may be performed by one or more elements of station 120 such as by one or 30 more of processing circuitry 1320 (including IRM unit 1323), processor 1321, RF transmitter 1311, and RF receiver 1312. STA 120 is configured to exchange (Block S1802) one IRM key (IRMK) with the AP for each association of a plurality of associations; determine (Block S1804) an IRM hash using the first or both of (1) the IRMA and the IRMK exchanged with the AP at an immediately previous association of the plurality of associations; and (2) a temporal element; associate (Block S1806) to the AP using the IRMA as a transmitted address (TA); and transmit an association request including the IRM hash, the transmitted association request triggering the AP to one or both of check a list of stored IRMKs to find one stored IRMK that together with the IRMA produces the IRM hash included in the association request; and identify the STA by the one IRMK.

In some embodiments, the method further includes at a first association of the plurality of associations, either: selecting a first IRMK; associating to the AP; and transmitting to the AP the transmitted first IRMK; or: associating to the AP; and receiving from the AP the first IRMK. The method further includes triggering the AP and STA to store the first IRMK.

In some other embodiments, the method further includes, at a second association of the plurality of associations, creating the IRMA; determining the IRM hash based on the IRM and the first IRMK; transmitting an association request frame to the AP using the IRMA as the TA; associating to the AP and exchanging a second IRMK with the AP; and including the IRM hash in the association.

In an embodiment, the method further includes, at each one of one or more associations subsequent to the first and second associations, creating another IRMA; determining another IRM hash using one IRMK the STA exchanged with the AP at the previous association; transmitting another association request frame to the AP using the other IRMA as the TA; associating to the AP and exchanging another IRMK with the AP; and including the IRM hash in the association.

In another embodiment, the one IRMK is transmitted by the STA to the AP in one or more of an IRMK response packet in response to an IRMK request packet transmitted by the AP; a second message of a four-way handshake; and a fourth message of the four-way handshake.

In some embodiments, the one IRMK is transmitted by the AP to the STA in a third message of a four-way handshake.

In some other embodiments, the method further includes including an IRM element in the association request.

In an embodiment, the IRM element one or more of indicates an IRM hash value; includes first information indicating whether the STA has previously associated with that AP; and includes second information associated with the IRMK usable by the AP in down selecting a list of stored IRMKs.

In another embodiment, the second information comprises an IRMK check field comprising an offset field and a check value field.

In some embodiments, the offset field has a value N, and the check field include eight bits where for n=0 to 7, bn=(bN, bN+7), where bN is Nth bit in IRMK.

In some other embodiments, the offset field has a value N, and the check field include eight bits representing an exclusive or (EX-OR) logical operation where for n=0 to 7, bn=EX-OR (bN+n, bN+n+8), where bN is Nth bit in the IRMK.

In some embodiments, at least a first association and a second association of the plurality of associations are performed by one or both of the STA and the AP. At a first association, the method includes either receiving and storing a first IRMK from the STA, or transmitting a first IRMK to the STA; and at a second association, receiving from or transmitting to and then storing a second IRMK from the STA; determining an IRM hash value for each stored IRMK, from the IRMA; finding the first IRMK, where the first IRMK produces the IRM hash value included by the STA in the association request; and identifying the STA based on the found first IRMK.

In some other embodiments, the one IRMK is transmitted using one of secure action frames and key data encapsulation (KDE) in a four way handshake.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the details of the frame formats; the nomenclature used for fields in the frames; the order of the steps in the methods 1500, 1600 and 1700; the number of bits in the IRM Hash; the number of bits in the IRMK; the hash function used to determine the IRM Hash. Accordingly, the scope should be determined not by the embodiments illustrated, but by the claims and embodiments.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope.

What is claimed is:

1. A method for a mobile station (STA) to use an identifiable medium access control (MAC) random (IRM) address (IRMA) to associate to an access point (AP), the method comprising:
 exchanging one IRM key (IRMK) with the AP for each association of a plurality of associations;
 determining an IRM hash using the first or both of:
  (1) the IRMA and the IRMK exchanged with the AP at an immediately previous association of the plurality of associations; and
  (2) a temporal element;
 associating to the AP using the IRMA as a transmitted address (TA); and
 transmitting an association request including the IRM hash, the transmitted association request triggering the AP to one or both of:
  check a list of stored IRMKs to find one stored IRMK that together with the IRMA produces the IRM hash included in the association request; and
  identify the STA by the one IRMK.

2. The method of claim 1, wherein the method further includes:
 at a first association of the plurality of associations:
  either:
   selecting a first IRMK;
   associating to the AP; and
   transmitting to the AP the first IRMK;
  or:
   associating to the AP; and
   receiving from the AP the first IRMK; and
  triggering the AP and STA to store the first IRMK.

3. The method of claim 2, wherein the method further includes:
 at a second association of the plurality of associations:
  creating the IRMA;
  determining the IRM hash based on the IRM and the first IRMK;
  transmitting an association request frame to the AP using the IRMA as the TA;
  associating to the AP and exchanging a second IRMK with the AP; and
  including the IRM hash in the association.

4. The method of claim 3, wherein the method further includes:
 at each one of one or more associations subsequent to the first and second associations:
  creating another IRMA;
  determining another IRM hash using one IRMK the STA exchanged with the AP at the previous association;
  transmitting another association request frame to the AP using the another IRMA as the TA;

associating to the AP and exchanging another IRMK with
   the AP; and
   including the IRM hash in the association.
5. The method of claim 1, wherein the one IRMK is transmitted by the STA to the AP in one or more of:
   an IRMK response packet in response to an IRMK request packet transmitted by the AP;
   a second message of a four-way handshake; and
   a fourth message of the four-way handshake.
6. The method of claim 1, wherein the one IRMK is transmitted by the AP to the STA in a third message of a four-way handshake.
7. The method of claim 1, wherein the method further includes:
   including an IRM element in the association request.
8. The method of claim 7, wherein the IRM element one or more of:
   indicates an IRM hash value;
   includes first information indicating whether the STA has previously associated with that AP, and
   includes second information associated with the IRMK usable by the AP in down selecting a list of stored IRMKs.
9. The method of claim 8, wherein the second information comprises an IRMK check field comprising an offset field and a check value field.
10. The method of claim 9, wherein the offset field has a value N, and the check value field include eight bits where:

for $n=0$ to 7, $b_n=(b_N, b_{N+7})$ where $b_N$ is Nth bit in IRMK.
11. The method of claim 9, wherein the offset field has a value N, and the check value field include eight bits representing an exclusive or (EX-OR) logical operation where:

For $n=0$ to 7, $b_n=EX\text{-}OR\ (b_{N+n}, b_{N+n+8})$ where $b_N$ is Nth bit in the IRMK.
12. A mobile station (STA) configured to use an identifiable medium access control (MAC) random (IRM) address (IRMA) to associate to an access point (AP), the STA comprising processing circuitry configured to:
   cause exchange of one IRM key (IRMK) with the AP for each association of a plurality of associations;
   determine an IRM hash using the first or both of:
      (1) the IRMA and the IRMK exchanged with the AP at an immediately previous association of the plurality of associations; and
      (2) a temporal element;
   associate to the AP using the IRMA as a transmitted address (TA); and
   cause transmission of an association request including the IRM hash, the transmitted association request triggering the AP to one or both of:
      check a list of stored IRMKs to find one stored IRMK that together with the IRMA produces the IRM hash included in the association request; and
      identify the STA by the one IRMK.
13. The STA of claim 12, wherein the processing circuitry is further configured to:
   at a first association of the plurality of associations:
      either:
         select a first IRMK;
         associate to the AP; and
         cause transmission of the first IRMK to the AP;
      or:
         associate to the AP; and
         receive from the AP the first IRMK; and
         trigger the AP to store the first IRMK.
14. The STA of claim 13, wherein the processing circuitry is further configured to:
   at a second association of the plurality of associations:
      create the IRMA;
      determine the IRM hash based on the IRM and the first IRMK;
      cause transmission of an association request frame to the AP using the IRMA as the TA;
      associate to the AP and exchanging a second IRMK with the AP; and
      include the IRM hash in the association.
15. The STA of claim 14, wherein the processing circuitry is further configured to:
   at each one of one or more associations subsequent to the first and second associations:
      create another IRMA;
      determine another IRM hash using one IRMK the STA exchanged with the AP at the previous association;
      cause transmission of another association request frame to the AP using the another IRMA as the TA;
      associate to the AP and exchange another IRMK with the AP; and
      include the IRM hash in the association.
16. The STA of claim 12, wherein the one IRMK is transmitted by the STA to the AP in one or more of:
   an IRMK response packet in response to an IRMK request packet transmitted by the AP;
   a second message of a four-way handshake; and
   a fourth message of the four-way handshake.
17. The STA of claim 12, wherein the one IRMK is transmitted by the AP to the STA in a third message of a four-way handshake.
18. The STA of claim 12, wherein the processing circuitry is further configured to:
   include an IRM element in the association request, the IRM element one or more of:
      indicating an IRM hash value;
      including first information indicating whether the STA has previously associated with that AP; and
      including second information associated with the IRMK usable by the AP in down selecting a list of stored IRMKs.
19. The STA of claim 18, wherein the second information comprises an IRMK check field comprising an offset field and a check value field.
20. A system comprising a mobile station (STA) and an access point (AP), the STA being configured to use an identifiable medium access control (MAC) random (IRM) address (IRMA) to associate to the AP,
   the STA comprising first processing circuitry configured to:
      one or both of:
         cause transmission of one IRM key (IRMK) to the AP for each association of a plurality of associations; and
         receive one IRM key (IRMK) from the AP for each association of a plurality of associations;
      determine an IRM hash using the IRMA and an IRMK provided to or received from the AP at an immediately previous association of the plurality of associations;
      associate to the AP using the IRMA as a transmitted address (TA);
      cause transmission of an association request including the IRM hash;

the AP comprising second processing circuitry configured to:
check a list of stored IRMKs to find one stored IRMK that together with the IRMA produces the IRM hash included in the association request; and
identify the STA by the one IRMK.

\* \* \* \* \*